US009855983B2

(12) United States Patent
Dogahira et al.

(10) Patent No.: US 9,855,983 B2
(45) Date of Patent: Jan. 2, 2018

(54) RECTIFIER TO PREVENT AIRFLOW FLOWING OUTWARD IN VEHICLE WIDTH DIRECTION

(71) Applicant: FUJI JUKOGYO KABUSHIKI KAISHA, Tokyo (JP)

(72) Inventors: Yusaku Dogahira, Tokyo (JP); Naoto Watanabe, Tokyo (JP); Hiroshi Niitsu, Tokyo (JP); Kento Ota, Tokyo (JP); Hisafumi Nakaura, Tokyo (JP); Hiroshi Natsui, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/279,636

(22) Filed: Sep. 29, 2016

(65) Prior Publication Data

US 2017/0088198 A1    Mar. 30, 2017

(30) Foreign Application Priority Data

Sep. 30, 2015 (JP) .................................. 2015-193247

(51) Int. Cl.
   *B62D 35/00* (2006.01)
(52) U.S. Cl.
   CPC .......... *B62D 35/005* (2013.01); *B62D 35/00* (2013.01); *B62D 35/008* (2013.01)
(58) Field of Classification Search
   CPC .... B62D 35/005; B62D 35/008; B62D 35/00; B62D 35/001
   See application file for complete search history.

(56) References Cited

U.S. PATENT DOCUMENTS

2014/0376119 A1* 12/2014 Sobecki ................. B60R 1/074
                                                            359/841

FOREIGN PATENT DOCUMENTS

| FR | 2848521 A1 | 6/2004 | |
|---|---|---|---|
| JP | 60163174 U | 10/1985 | |
| JP | 61094484 U | 6/1986 | |
| JP | 61205832 U | 12/1986 | |
| JP | 05062392 U | 8/1993 | |
| JP | 2000142493 A | 5/2000 | |
| JP | 2007269102 A | 10/2007 | |
| JP | 2011-255758 A | 12/2011 | |
| JP | 2012071831 A | 4/2012 | |
| JP | 2014-069611 A | 4/2014 | |
| JP | 2015083459 A | 4/2015 | |
| WO | WO 2015072476 A1 * | 5/2015 | ............. B62D 25/02 |

\* cited by examiner

*Primary Examiner* — Glenn Dayoan
*Assistant Examiner* — Melissa A Black
(74) *Attorney, Agent, or Firm* — Chip Law Group

(57) ABSTRACT

A rectifier that is installed on a vehicle which includes a front shield at a front of a vehicle compartment, a hood in front of the front shield, a cowl between a back edge of the hood and a lower end of the front shield, and a fender on an outside of the hood and the cowl in a vehicle width direction, the rectifier including a rectifier member that is installed at a region on a side surface of the fender and adjacent to the back edge of the hood, and has a negative pressure generation part which causes an airflow created when the vehicle travels to generate a negative pressure backward. The front shield is shaped like a curved surface that projects toward a front of the vehicle. At least a part of the negative pressure generation part is disposed in front of a shield extension virtual curve.

20 Claims, 6 Drawing Sheets

RECTIFIER TO PREVENT AIRFLOW FLOWING OUTWARD IN VEHICLE WIDTH DIRECTION

CROSS-REFERENCE TO RELATED APPLICATIONS

The present application claims priority from Japanese Patent Application No. 2015-193247 filed on Sep. 30, 2015, the entire contents of which are hereby incorporated by reference.

BACKGROUND

1. Technical Field

The present invention relates to rectifiers that each project from a front fender of an automobile, and in particular, a rectifier that prevents airflow flowing outward in a vehicle width direction from a cowl between a hood and a front shield from creating turbulence around a front pillar.

2. Related Art

The vehicle body of an automobile such as a car typically has both ends of the front shield, which is made of glass and installed at the front of the vehicle compartment, supported by pillar members called front pillars (A pillars).

Airflow called traveling wind is created around the vehicle body when the vehicle travels, and the traveling wind flows from the center to the side ends of the front shield and creates turbulence such as tumble flows around the front pillars. This causes an aerodynamic noise such as a so-called wind noise, and degrades the quietness, feel of the material, comfort, and the like of the vehicle.

As a conventional technique of improving the quietness of a vehicle by rectifying traveling wind around the A pillars, for example, Japanese Unexamined Patent Application Publication (JP-A) No. 2011-255758 describes that an outer molding having a molded part which covers a side end of a windshield (front shield) is mounted on the surface of a front pillar.

Meanwhile, JP-A No. 2014-69611 describes that a passage in a predetermined shape through which air flows is formed between a front pillar and a pillar outer cover attached to the outside of the front pillar on the purpose of improving the aerodynamic performance of the region around the front pillar.

A vehicle that has a front hood in front of the vehicle compartment includes a cowl between the back edge of the front hood and the front shield for storing the windshield wiper blades and the like.

The cowl is typically a recessed part lower than the back edge of the front hood in the up-down direction of the vehicle, and formed over substantially the entire width of the lower end of the front shield.

A vehicle including this type of cowl lets airflow from the front into the cowl, and airflow flowing from the center to the left and right sides in the cowl flows backward over the fenders at the side ends of the cowl in the vehicle width direction. The airflow is involved in tumble flows behind the front pillars, thereby increasing the wind noise behind the front pillars in some cases.

It is desirable to provide a rectifier that prevents airflow flowing outward in a vehicle width direction from a cowl between a hood and a front shield from creating turbulence around a front pillar.

SUMMARY OF THE INVENTION

The present invention overcomes the problem by the following solutions.

An aspect of the present invention provides a rectifier that is installed on a vehicle which includes a front shield at a front of a vehicle compartment, a hood in front of the front shield, a cowl between a back edge of the hood and a lower end of the front shield, and a fender on an outside of the hood and the cowl in a vehicle width direction, the rectifier including: a rectifier member that is installed at a region on a side surface of the fender and adjacent to the back edge of the hood, and has a negative pressure generation part which causes an airflow created when the vehicle travels to generate a negative pressure backward. The front shield is shaped like a curved surface that projects toward a front of the vehicle. At least a part of the negative pressure generation part is disposed in front of a shield extension virtual curve extending outward in the vehicle width direction from a curve of the lower end of the front shield in a plan view.

The at least part of the negative pressure generation part may be disposed in front of a shield extension virtual straight line extending outward in the vehicle width direction from a tangential line to an outer end of the lower end of the front shield in the vehicle width direction in the plan view.

The at least part of the negative pressure generation part may be disposed in front of a hood extension virtual curve set to advance the shield extension virtual curve through an outer end of the back edge of the hood in the vehicle width direction.

The at least part of the negative pressure generation part may be disposed in front of a hood extension virtual straight line set to advance a shield extension virtual straight line extending outward in the vehicle width direction from a tangential line to the outer end of the lower end of the front shield in the vehicle width direction in the plan view through the outer end of the back edge of the hood in the vehicle width direction.

A curvature of the lower end of the front shield in the plan view may be larger than a curvature of the back edge of the hood in the plan view.

The rectifier member may have, in a side view of the vehicle, an airfoil disposed in a direction in which a negative pressure is generated above the rectifier member. The negative pressure generation part may be provided on a top surface of the airfoil.

The airfoil may be disposed to have a plus attack angle.

The airfoil may have a portion of a maximum airfoil thickness disposed in front of at least one of the shield extension virtual curve, the shield extension virtual straight line, the hood extension virtual curve, and the hood extension virtual straight line.

A back edge of the airfoil may be positioned below a lower end of a door mirror in an up-down direction, and positioned near a door front edge in a front-back direction.

The rectifier member may be provided with an imager that images a circumstance outside the vehicle.

The imager may image at least one of an area behind the vehicle, an area on a side of the vehicle, and an area below the vehicle.

DETAILED DESCRIPTION

Figure 1:
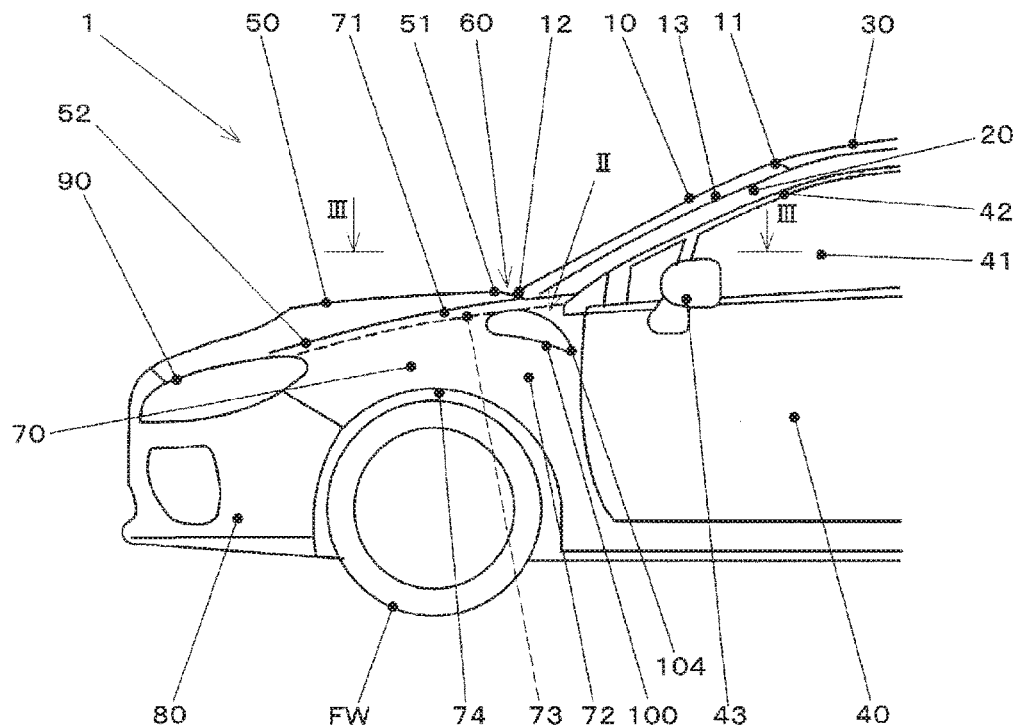
FIG. 1 is a schematic side view of a front of a vehicle body of a vehicle including Implementation 1 of a rectifier to which the present invention is applied.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

The present invention achieves an object of providing a rectifier that prevents airflow flowing outward in the vehicle width direction from a cowl between a hood and a front shield from creating turbulence around a front pillar, by providing a negative pressure generation part that projects from the side surface of the fender on a side of the cowl and generates negative pressure with traveling wind, and disposing the negative pressure generation part in front of a round extension of the front shield.

[Implementation 1]

The following describes Implementation 1 of a rectifier to which the present invention is applied.

The rectifier according to Implementation 1 is, for example, installed in an automobile such as a car of a so-called two-box or three-box type, which is equipped with an engine room in front of the vehicle compartment.

FIG. 1 is a schematic side view of the front of the vehicle body of a vehicle including the rectifier according to Implementation 1.

Figure 2:
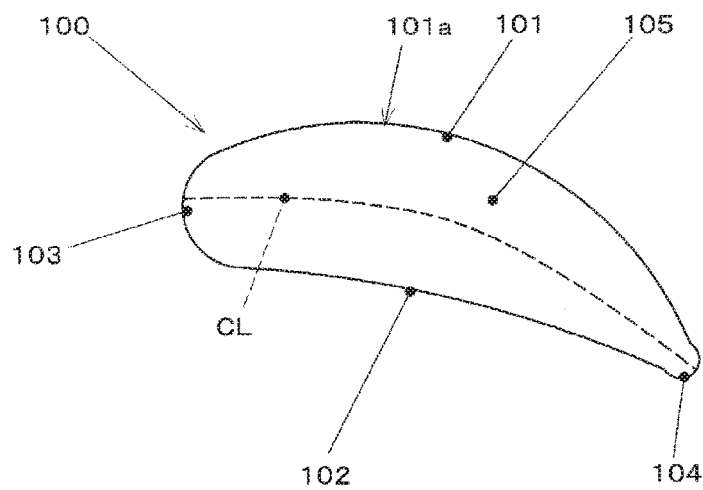
FIG. 2 is an enlarged view of a II section of FIG. 1.

FIG. 2 is an enlarged view of a II section of FIG. 1.

Figure 3:
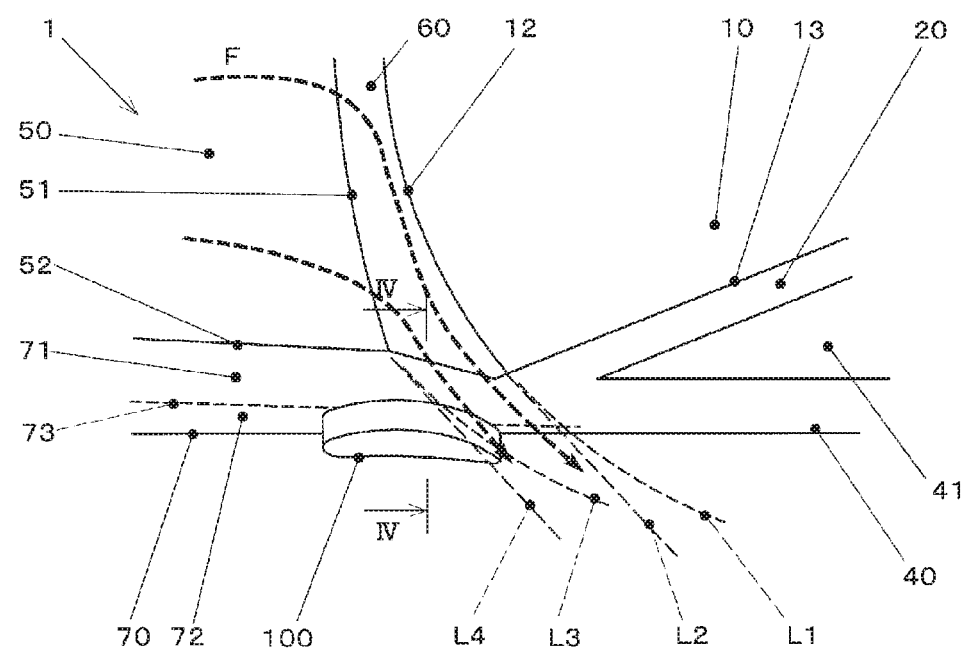
FIG. 3 schematically illustrates a III-III section of FIG. 1.

FIG. 3 schematically illustrates a III-III section of FIG. 1.

Figure 4A:
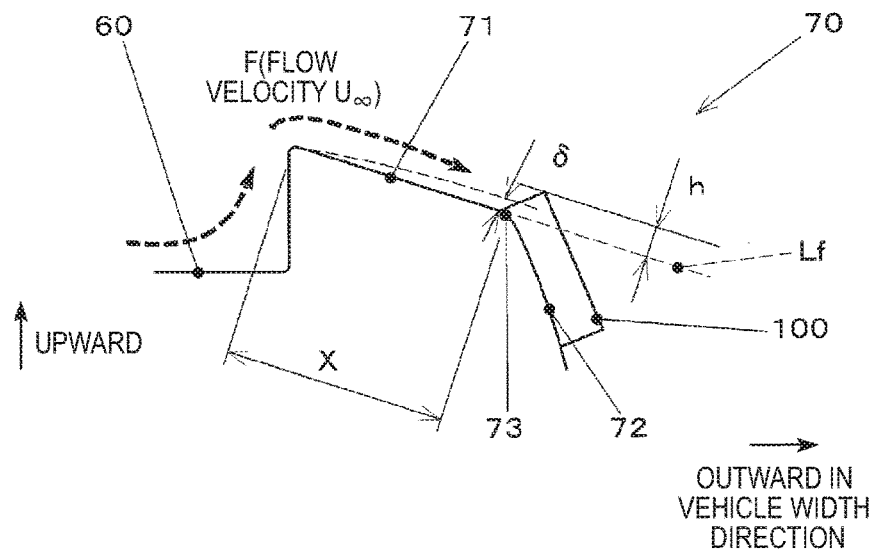
FIG. 4A is a schematic cross-sectional view of a IV-IV section of FIG. 3, and illustrates a configuration according to Implementation 1.

FIG. 4A is a schematic cross-sectional view of a IV-IV section of FIG. 3.

Each figure uses a thick dashed arrow to schematically illustrate airflow (traveling wind) F created when a vehicle 1 travels.

The vehicle 1 includes a front shield 10, a front pillar 20, a roof 30, a front door 40, a hood 50, a cowl 60, a fender 70, a bumper face 80, a front combination lamp 90, a rectifier member 100, and the like.

The front shield 10 is a window made of glass and installed at the front of the vehicle compartment.

The front shield 10 is shaped substantially rectangular, and disposed to incline backward in a manner that an upper end 11 of the front shield 10 is positioned closer to the back of the vehicle than a lower end 12 of the front shield 10.

As illustrated in FIG. 3, the lower end 12 is curved in the plan view so as to project toward the front of the vehicle.

The front shield 10 has a side end 13 disposed along the front pillar 20.

The front shield 10 is made of laminated glass having a quadric surface, and bent (round) so as to project toward the front of the vehicle.

The front pillar (A pillar) 20 is a structural member of the vehicle body which extends along the side end 13 of the front shield 10.

The back edge of the front pillar 20 is disposed adjacent to a sash around the front door window positioned at the upper part of the front door 40.

The roof 30 is a panel composing the top surface of the vehicle compartment.

The roof 30 extends from the upper end of the front shield 10 to the back of the vehicle.

The front door 40 is an opening and closing door installed at a side surface of the front of the vehicle compartment.

The front door 40 opens and closes, swinging around a hinge that is installed at the front end, but not illustrated.

The front door 40 includes a front door window 41, a door sash 41, a door mirror 43, and the like.

The front door window 41 is installed at the upper part of the front door 40.

The door sash 42 is a frame that is formed, for example, along the front and upper edges of the front door window 41 and holds the front door window 41.

The door sash 42 has the front edge disposed along the front pillar 20, and the upper edge disposed along a roof side frame installed at a side end of the roof 30.

The door mirror 43 is a device installed at the upper front region of the door outer panel composing the outer surface of the body of the front door 40, and the door mirror 43 allows a driver to view the area behind the vehicle.

The door mirror 43 is supported by a stay that projects from the door outer panel.

The door mirror 43 includes, for example, a mirror body, an angle adjusting mechanism, and a foldable storage mechanism that are housed in a housing.

The hood 50 is an exterior member that covers the top of the engine room, and is shaped like an opening and closing lid.

The hood 50 is shaped substantially rectangular in the plan view of the vehicle, and disposed to incline in a manner that the front end is slightly lower than the back end. Additionally, this inclination angle is smaller than the inclination angle of the front shield 10.

The hood 50 opens and closes, swinging around a hinge installed at the back end in the direction in which the front end moves up and down.

The hood 50 has a back edge 51 disposed in front of the lower end 12 of the front shield 10 with space in between in the front-back direction of the vehicle.

As illustrated in FIG. 3, the back edge 51 is curved in the plan view so as to project toward the front of the vehicle.

The hood 50 has a side edge 52 disposed adjacent to an inner end of a top surface 71 of the fender 70 in the vehicle width direction via an inevitable gap.

The cowl 60 is installed at the region behind the back edge 51 of the hood 50 and in front of the lower end 12 of the front shield 10, and is a recessed part lower than the surface of the hood 50 in the up-down direction of the vehicle.

The cowl 60 stores, for example, a wiper arm in a cowl top panel formed as a tray made of a resin-based material and recessed downward.

The cowl 60 has a side end in the vehicle width direction disposed adjacent to the region near the back end of the top surface 71 of the fender 70.

The fender 70 is an exterior member composing a side surface of the engine room and the like.

Figure 4B:
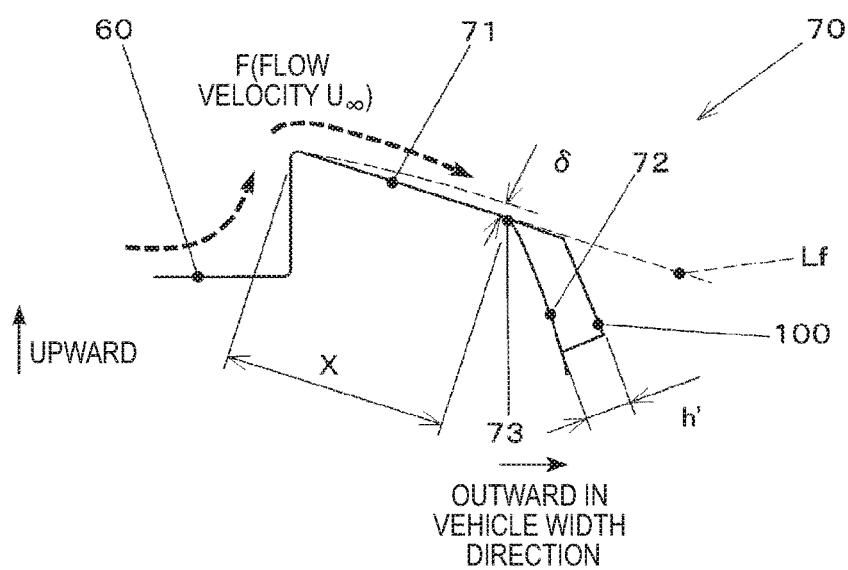
FIG. 4B is a schematic cross-sectional view of the IV-IV section of FIG. 3, and illustrates a configuration according to a modification of Implementation 1.

The fender 70 has the top surface 71, a side surface 72, and the like as illustrated in FIGS. 4A and 4B.

The top surface 71 is the region adjacent to the side edge 52 of the hood 50 and a side end of the cowl 60. The top surface 71 is formed substantially along the curved surface extending outward in the vehicle width direction from the curved surface composing the surface of the hood 50.

The side surface 72 extends downward from the region near an outer end of the top surface 71 in the vehicle width direction.

The side surface 72 is formed as a slightly curved surface that projects outward in the vehicle width direction.

The curvature of the curved surface is locally large on the border between the top surface 71 and the side surface 72, and an inflection point 73 forming the so-called ridge (flexion line) of the fender 70 is continuously formed in the front-back direction of the vehicle.

The side surface 72 has an opening 74 of a wheel house for housing a front wheel FW.

The bumper face 80 is an exterior member made of resin and installed at the lower part of the front end of the vehicle.

The bumper face 80 is installed in front of the opening 74 of the fender 70.

The front combination lamp 90 is a unit that houses a variety of lighting devices such as a headlamp, a position lamp, and a turn signal lamp in a common housing.

The front combination lamp 90 is disposed at the front end of the vehicle below the hood 50 and above the bumper face 80.

The rectifier member 100 composes the body of the rectifier according to Implementation 1.

The rectifier member 100 projects outward in the vehicle width direction from the region near the upper end of the side surface 72 of the fender 70.

As illustrated in FIG. 2, the rectifier member 100 has an airfoil (foil) as viewed from the vehicle width direction, and has a top surface 101, a bottom surface 102, a front edge 103, a back edge 104, a wing end 105, and the like.

The rectifier member 100 has an airfoil, and can thus generate efficiently strong negative pressure by using traveling wind, which facilitates the above-described advantageous effects.

The top surface 101 and the bottom surface 102 are curved surfaces each of which projects upward.

The top surface 101 is disposed over the bottom surface 102, and has a larger curvature than the curvature of the bottom surface 102.

The front ends and the back ends of the top surface 101 and the bottom surface 102 are coupled to each other by the front edge 103 and the back edge 104.

The front edge 103 and the back edge 104 are each shaped like a projecting curved surface having a smaller curvature than the curvatures of the top surface 101 and the bottom surface 102.

The wing end 105 is a flat surface formed at the projecting end (wing end) of the rectifier member 100.

Sequentially connecting the middle points of the top surface 101 and the bottom surface 102 of the rectifier member 100 offers a curve called an airfoil central line CL, and the airfoil central line CL is set to project upward like a curve.

The rectifier member 100 is disposed to have a plus attack angle by disposing the front edge 103 above the back edge 104.

This can make greater negative pressure at the top surface 101 of the airfoil.

Specifically, as illustrated in FIG. 1, the attack angle in the horizontal direction is considered to be 0 degrees, and to increase clockwise in the side view of the vehicle, the front of which faces in the left direction.

This rectifier member 100 has negative pressure on the surface of the top surface 101 upon receiving airflow from in front of the traveling vehicle (from the left in FIGS. 1 and 2). This portion may serve as a negative pressure generation part in an implementation of the present invention.

The top surface 101 has substantially the greatest negative pressure at a portion 101a that has the maximum wing thickness. This portion may serve as a negative pressure generation part in an implementation of the present invention.

It is possible to use a transparent material for a part of the outer surface of the rectifier member 100, and to install a camera equipped with a solid-state image sensor such as a CCD sensor and a CMOS sensor in the rectifier member 100.

That camera captures images of the circumstances on the sides of the vehicle, below the vehicle, behind the vehicle, and the like. The acquired images are displayed on an image display that can show a driver the acquired images, thereby allowing the driver to view the area behind the vehicle instead of the door mirror. In addition, the camera can serve for other use such as detecting an obstacle, lane line, and a parking space.

This eliminates the necessity of other dedicated projections in addition to the rectifier for installing an imager, and improves the aerodynamic performance and the exterior quality including a design of the vehicle.

This also prevents the number of parts from increasing, and simplifies the structure of the vehicle and makes the vehicle lighter as a whole.

As illustrated in FIG. 1, the back end of the rectifier member 100 is positioned below the lower end of the door mirror 43 in the height direction, and positioned near the front end of the front door 40 in the front-back direction.

As illustrated in FIG. 3, the curvature of the lower end 12 of the front shield 10 is larger (more sharply round) than the curvature of the back edge 51 of the hood 50 in the plan view of the vehicle 1 as viewed from above in the perpendicular direction in Implementation 1.

The lower end 12 of the front shield 10 is now extended outward in the vehicle width direction without changing the curvature in order to set a first virtual line L1 In one implementation, the first virtual line L1 may serve as a "shield extension virtual curve."

In addition, the tangential line to the lower end 12 of the front shield 10 is extended outward in the vehicle width direction in order to set a second virtual line L2. In one implementation, the second virtual line L2 may serve as a "shield extension virtual straight line."

Furthermore, the first virtual line L1 is advanced through an outer end of the back edge 51 of the hood 50 in the vehicle width direction in order to set a third virtual line L3. In one implementation, the third virtual line L3 may serve as a "hood extension virtual curve."

Furthermore, the second virtual line L2 is advanced through an outer end of the back edge 51 of the hood 50 in the vehicle width direction in order to set a fourth virtual line L4. In one implementation, the fourth virtual line L4 may serve as a "hood extension virtual straight line."

The negative pressure generation part (maximum wing thickness portion) of the rectifier member 100 is disposed closer to the front of the vehicle than the first to fourth virtual lines L1 to L4 in Implementation 1.

This introduces, downward, airflow blown from the cowl 60 in the vehicle width direction by using the maximum negative pressure that the airfoil can generate, and facilitates the above-described advantageous effects even more.

As illustrated in FIG. 4A, a part of the negative pressure generation part (top surface 101) of the rectifier 100 is disposed to project upward beyond a virtual line Lf that extends outward in the vehicle width direction from the curve in the front view of the surface of the top surface 71 of the fender 70.

For example, when the vehicle 1 travels at a velocity (of approximately 80 km/h, as an example, though the velocity depends on vehicle types) offering a difference of 3 dB between the sound pressure level of an aerodynamic noise (wind noise) alone and the sound pressure levels of all the noises (including noises of the engine and drive system, road noises of the tires, and a pattern noise in addition to the aerodynamic noise) in the vehicle compartment of the vehicle 1, which are measured by a microphone installed at the position of an ear of the driver on the driver's seat in the vehicle compartment, a boundary layer formed on the surface of the top surface 71 by airflow blown from the cowl 60 toward the fender 70 and flowing toward the flection point 73 along the top surface 71 is considered to have a thickness of δ, and the projection amount h of the negative pressure generation part of the rectifier 100 from the virtual line Lf is set larger than δ.

When the vehicle 1 travels at the above set velocity, all the noises of the vehicle 1 serve, for example, as an index indicating irregularities of the surface of a road and are measured on a road surface which has, for example, a flatness of 0.8 mm or less measured every 3 m.

The thickness δ of the boundary layer is obtained by the following expression.

$$\delta = \sqrt{\frac{vx}{U_\infty}} \qquad \text{(Expression 1)}$$

δ: Thickness (m) of Boundary Layer
v: Coefficient of Kinematic Viscosity of Air (1.512 (10-5 m2/sec) at Normal Temperature of 20 Degrees Celsius)
x: Length of Top Surface 71 of Fender 70 along Airflow (m)
U∞: Flow Velocity of Air (m/sec)

For example, x is equal to 0.05 m and U∞ is equal to 22.2 m/s (80 km/h), the thickness δ of the boundary layer is nearly equal to 0.0003 (m).

The negative pressure generation part of the rectifier member 100 projects beyond this thickness δ of the boundary layer, thereby efficiently exerting the advantageous effects of the negative pressure on airflow F and introducing the airflow F downward.

Additionally, even when the upper end of the rectifier member 100 does not project upward beyond the virtual line Lf (i.e. h≤0) like a modification illustrated in FIG. 4B instead of the configuration illustrated in FIG. 4A, it is possible to attain substantially the same advantageous effects as long as a projection amount h' of the rectifier member 100 from the surface of the fender 70 (e.g. maximum distance h' by which the rectifier member 100 projects outward in the vehicle width direction from the vertical line drawn from the side surface 72 below the flection point 73) is set larger than the thickness δ of the boundary layer.

The following describes the advantageous effects attained by the rectifier according to Implementation 1 in comparison with a reference example of the present invention.

The rectifier (rectifier member 100) alone is removed from the vehicle including the rectifier according to Implementation 1 in a vehicle according to the reference example of the present invention.

Figure 5:
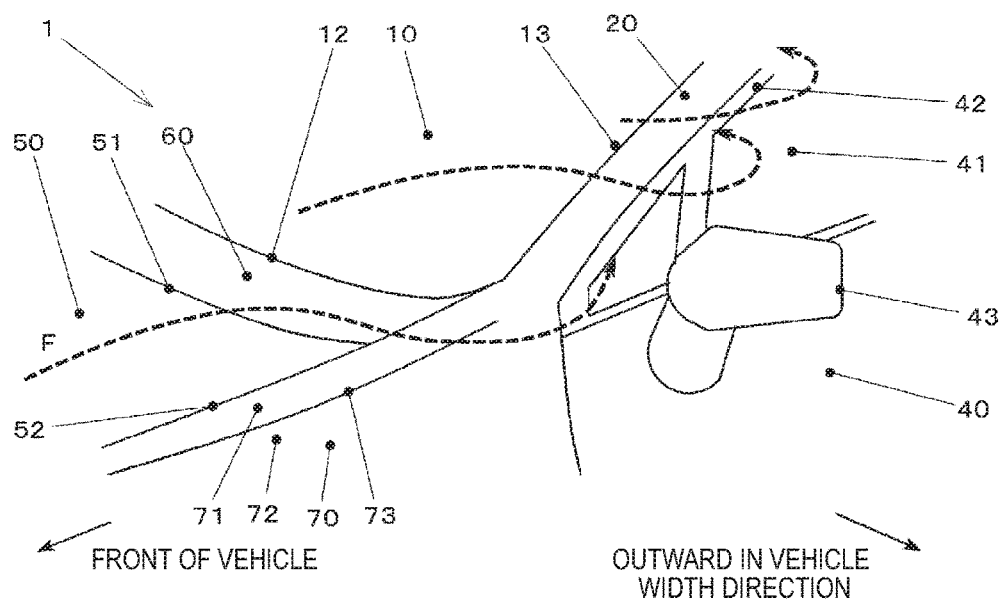
FIG. 5 schematically illustrates airflow around a cowl of a traveling vehicle according to a reference example of the present invention.

FIG. 5 schematically illustrates airflow around a cowl of a traveling vehicle according to the reference example.

A part of the airflow F flowing along the hood 50 flows into the cowl 60 due to the interference with the front shield 10, and flows outward in the vehicle width direction from the center of the cowl 60 in the recessed part of the cowl 60 in the reference example illustrated in FIG. 5.

The airflow F blown outward in the vehicle width direction over the top surface 71 of the fender 70 from an end of the cowl 60 in the vehicle width direction flows backward to mix with a tumble flow around the front pillar 20, and increases the energy of the air turbulence around the front pillar 20, circumstantially increasing the aerodynamic noise (wind noise).

Figure 6:
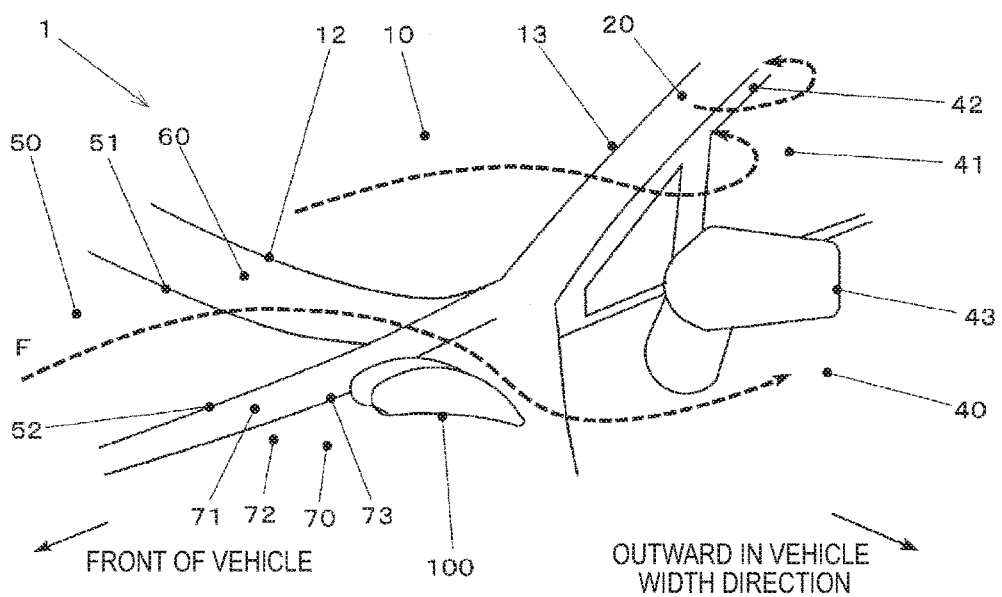
FIG. 6 schematically illustrates airflow around a cowl of a traveling vehicle including the rectifier according to Implementation 1.

FIG. 6 schematically illustrates airflow around a cowl of a traveling vehicle including the rectifier according to Implementation 1.

The vehicle including the rectifier according to Implementation 1 has, near the top surface 101 of the rectifier member 100, a region having negative pressure relative to other regions due to traveling wind.

The airflow F blown outward in the vehicle width direction over the top surface 71 of the fender 70 from an end of the cowl 60 in the vehicle width direction is introduced downward substantially along the top surface 101 by the negative pressure generated behind the rectifier member 100, and the airflow F is blown from the region close to the back edge 104 of the rectifier member 100 toward the back of the vehicle, thereby advancing toward the back of the vehicle along the outer panel (side surface of the vehicle body) of the front door 40 through the region below the door mirror 43.

Accordingly, the vehicle 1 including the rectifier according to Implementation 1 has the energy of the air turbulence around the front pillar 20 less than that of the reference example, which makes it possible to decrease the aerodynamic noise.

[Implementation 2]

The following describes Implementation 2 of a rectifier to which the present invention is applied.

Structural elements that are substantially the same as those of the above-described implementation are denoted with the same reference numerals, and repeated description of these structural elements is omitted in the following implementations. Differences in between will be chiefly described.

Figure 7:
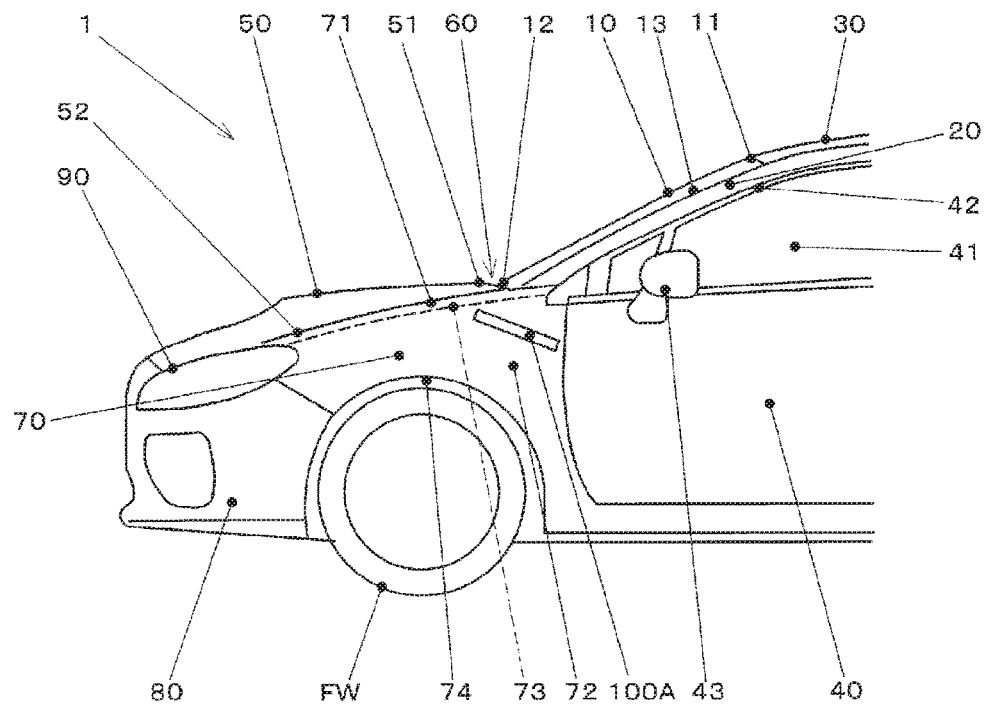
FIG. 7 is a schematic side view of a front of a vehicle body of a vehicle including Implementation 2 of a rectifier to which the present invention is applied.

FIG. 7 is a schematic side view of the front of the vehicle body of a vehicle including the rectifier according to Implementation 2.

The rectifier according to Implementation 2 includes a rectifier member 100A described below instead of the rectifier member 100 according to Implementation 1.

The rectifier member 100A is a flat member that projects from the fender 70 substantially in the same way as the rectifier member 100 according to Implementation 1.

The rectifier member 100A is disposed to incline in a manner that the front end is higher than the back end.

The back end of the rectifier member 100A is positioned below the lower end of the door mirror 43 in the height direction, and positioned near the front end of the front door 40 in the front-back direction.

This allows airflow blown from the cowl 60 to smoothly flow along the side surface of the door panel through the region below the door mirror 43 after introduced downward by negative pressure generated by an airfoil.

Implementation 2 described above also offers substantially the same advantageous effects as those of Implementation 1.

[Implementation 3]

Next, Implementation 3 of a rectifier to which the present invention is applied will be described.

Figure 8:
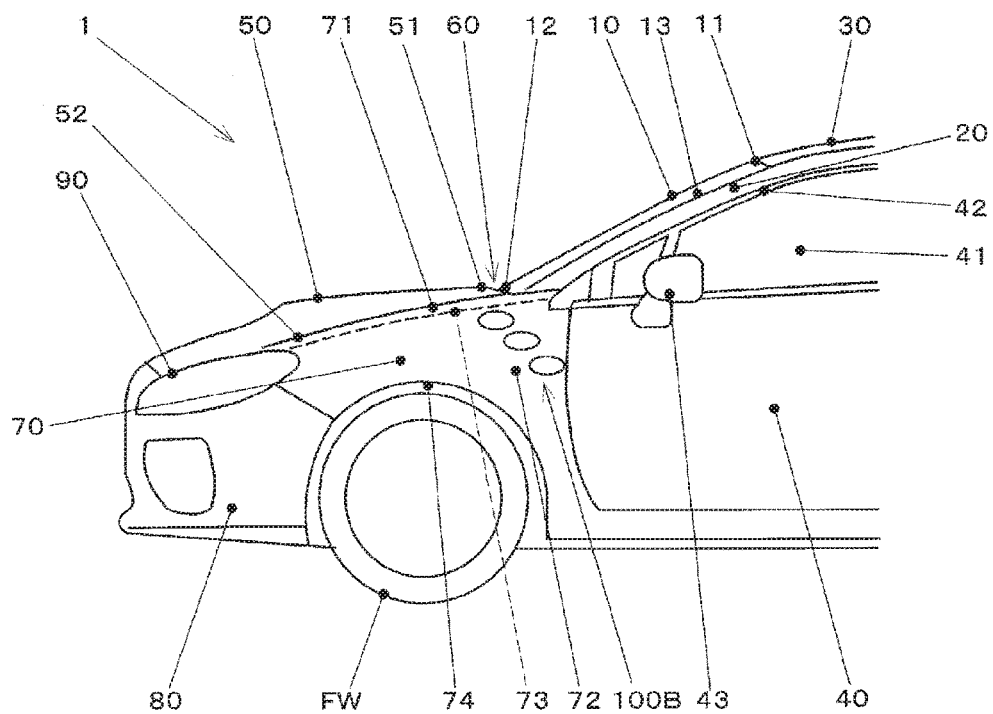
FIG. 8 is a schematic side view of a front of a vehicle body of a vehicle including Implementation 3 of a rectifier to which the present invention is applied.

FIG. 8 is a schematic side view of the front of the vehicle body of a vehicle including the rectifier according to Implementation 3.

The rectifier according to Implementation 3 includes a rectifier member 100B described below instead of the rectifier member 100 according to Implementation 1.

The rectifier member 100B has projections that look substantially oval as viewed from the vehicle width direction and are arranged on the side surface 72 of the fender 70 in the up-down direction.

Each projection is, for example, shaped substantially semicircular in the front view.

The projections are inclined forward in a manner that a lower projection is positioned closer to the back of the vehicle than an upper projection.

The front end of the uppermost projection is disposed at substantially the same position as the position of the front edge 103 of the rectifier member 100 according to Implementation 1.

The back end of the lowest projection is disposed at substantially the same position as the position of the back edge 104 of the rectifier member 100 according to Implementation 1.

The back end of the lowest projection is positioned below the lower end of the door mirror 43 in the height direction, and positioned near the front end of the front door 40 in the front-back direction.

Implementation 3 described above also offers substantially the same advantageous effects as those of Implementation 1.

[Implementation 4]

Next, Implementation 4 of a rectifier to which the present invention is applied will be described.

Figure 9:
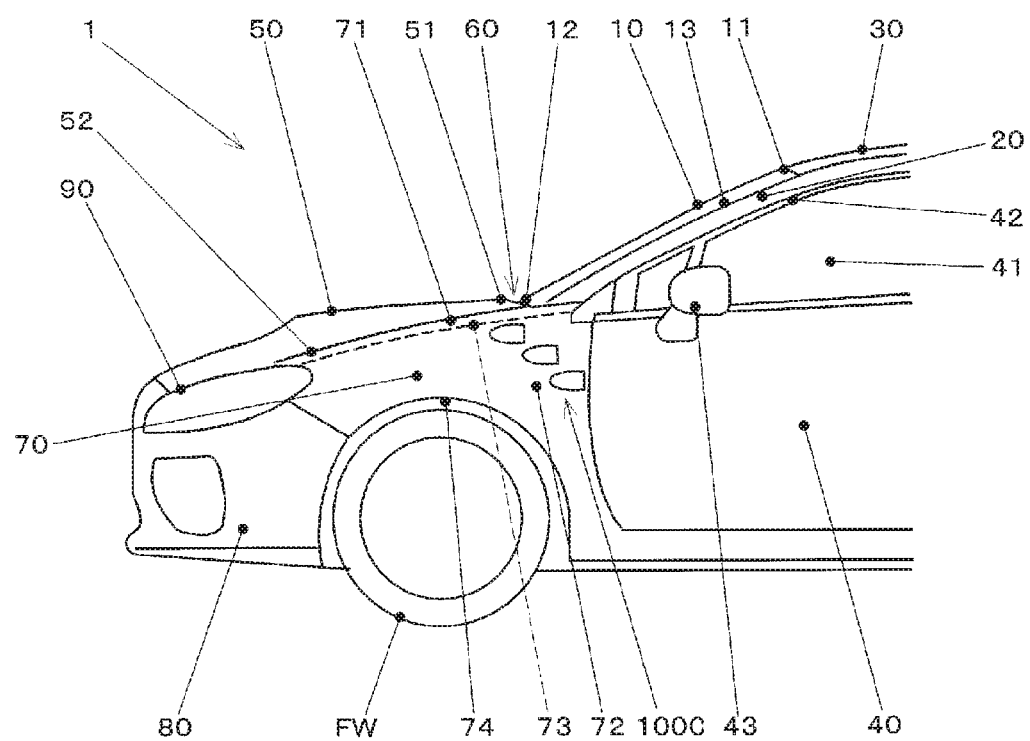
FIG. 9 is a schematic side view of a front of a vehicle body of a vehicle including Implementation 4 of a rectifier to which the present invention is applied.

FIG. 9 is a schematic side view of the front of the vehicle body of a vehicle including the rectifier according to Implementation 4.

The rectifier according to Implementation 4 includes a rectifier member 100C described below instead of the rectifier member 100B according to Implementation 3.

The rectifier member 100C has substantially bell-shaped or bullet-shaped projections that have, as viewed from the vehicle width direction, the back of the ovals cut along the plane extending substantially in the perpendicular direction and the vehicle width direction, and are arranged on the side surface 72 of the fender 70 in the up-down direction.

Each projection is, for example, shaped substantially semicircular in the front view.

The arrangement of the projections is substantially the same as that of the rectifier member 100B according to Implementation 3.

Implementation 4 described above also offers substantially the same advantageous effects as those of Implementation 1.

(Modification)

The present invention is not limited to the above-described implementations. There are various possible modifications and changes, and they also fall within the technical scope of the present invention.

The shape, structure, material, disposition, quantity, manufacturing method, and the like of structural elements included in the rectifier and the vehicle are not limited to the above-described implementations, but can be changed as necessary.

For example, the shape, quantity, and disposition of the rectifier member(s) can be changed as necessary as long as it is possible to generate negative pressure backward when the vehicle travels.

If there is an imager that captures an image of the area behind the vehicle in the rectifier member, it is possible to dispense with door mirror.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A rectifier on a vehicle, wherein the vehicle includes
a front shield at a front of a vehicle compartment,
a hood in front of the front shield,
a cowl between a back edge of the hood and a lower end of the front shield, and
a fender on an outside of the hood and the cowl in a vehicle width direction, the rectifier comprising:
a rectifier member at a region on a side surface of the fender and adjacent to the back edge of the hood,
wherein the rectifier member comprises a negative pressure generation part,
wherein the negative pressure generation part is configured to generate a negative pressure based on an airflow created upon a movement of the vehicle,
wherein the front shield has a curved surface that projects toward a front of the vehicle,
wherein at least a part of the negative pressure generation part is in front of a shield extension virtual curve,
wherein the shield extension virtual curve extends outward in the vehicle width direction from a curve of the lower end of the front shield in a plan view,
wherein a first end of the rectifier member is positioned higher than a second end of the rectifier member, based on an inclination of the rectifier member, and
wherein the first end of the rectifier member is directed toward the front of the vehicle and the second end of the rectifier member is directed toward a back of the vehicle.

2. The rectifier according to claim 1,
wherein at least the part of the negative pressure generation part is in front of a shield extension virtual straight line, and
wherein the shield extension virtual straight line extends outward in the vehicle width direction from a tangential line to an outer end of the lower end of the front shield in the vehicle width direction in the plan view.

3. The rectifier according to claim 1,
wherein at least the part of the negative pressure generation part is in front of a hood extension virtual curve, and
wherein the hood extension virtual curve is set to advance the shield extension virtual curve through an outer end of the back edge of the hood in the vehicle width direction.

4. The rectifier according to claim 2,
wherein at least the part of the negative pressure generation part is in front of a hood extension virtual curve, and
wherein the hood extension virtual curve is set to advance the shield extension virtual curve through an outer end of the back edge of the hood in the vehicle width direction.

5. The rectifier according to claim 1,
wherein at least the part of the negative pressure generation part is in front of a hood extension virtual straight line, and
wherein the hood extension virtual straight line is set to advance a shield extension virtual straight line that extends outward in the vehicle width direction from a tangential line to an outer end of the lower end of the front shield in the vehicle width direction in the plan view through an outer end of the back edge of the hood in the vehicle width direction.

6. The rectifier according to claim 2,
wherein at least the part of the negative pressure generation part is in front of a hood extension virtual straight line, and
wherein the hood extension virtual straight line is set to advance the shield extension virtual straight line that extends outward in the vehicle width direction from the tangential line to the outer end of the lower end of the front shield in the vehicle width direction in the plan view through an outer end of the back edge of the hood in the vehicle width direction.

7. The rectifier according to claim 3, wherein a curvature of the lower end of the front shield in the plan view is larger than a curvature of the back edge of the hood in the plan view.

8. The rectifier according to claim 4, wherein a curvature of the lower end of the front shield in the plan view is larger than a curvature of the back edge of the hood in the plan view.

9. The rectifier according to claim 1, wherein the rectifier member comprises, in a side view of the vehicle, an airfoil in a direction in which the negative pressure is generated above the rectifier member, and
wherein the negative pressure generation part is on a top surface of the airfoil.

10. The rectifier according to claim 2, wherein the rectifier member comprises, in a side view of the vehicle, an airfoil in a direction in which the negative pressure is generated above the rectifier member, and
wherein the negative pressure generation part is on a top surface of the airfoil.

11. The rectifier according to claim 9, wherein the airfoil has a plus attack angle.

12. The rectifier according to claim 10, wherein the airfoil has a plus attack angle.

13. The rectifier according to claim 9,
wherein a portion of the airfoil is in front of at least one of the shield extension virtual curve, a shield extension virtual straight line, a hood extension virtual curve, or a hood extension virtual straight line, and
wherein the portion of the airfoil has a maximum airfoil thickness.

14. The rectifier according to claim 10,
wherein a portion of the airfoil is in front of at least one of the shield extension virtual curve, the shield extension virtual straight line, a hood extension virtual curve, or a hood extension virtual straight line, and
wherein the portion of the airfoil has a maximum airfoil thickness.

15. The rectifier according to claim 9, wherein a back edge of the airfoil is positioned below a lower end of a door mirror in an up-down direction, and positioned at a distance, that is less than a threshold distance, from a door front edge in a front-back direction.

16. The rectifier according to claim 10, wherein a back edge of the airfoil is positioned below a lower end of a door mirror in an up-down direction, and positioned at a distance, that is less than a threshold distance, from a door front edge in a front-back direction.

17. The rectifier according to claim 1, wherein the rectifier member comprises an imager configured to capture an image of an area outside the vehicle.

18. The rectifier according to claim 2, wherein the rectifier member comprises an imager configured to capture an image of an area outside the vehicle.

19. The rectifier according to claim 17, wherein the image is one of an area behind the vehicle, an area on a side of the vehicle, or an area below the vehicle.

20. The rectifier according to claim 18, wherein the image is one of an area behind the vehicle, an area on a side of the vehicle, or an area below the vehicle.

* * * * *